US 6,571,778 B2

(12) United States Patent
Herm et al.

(10) Patent No.: US 6,571,778 B2
(45) Date of Patent: Jun. 3, 2003

(54) METHOD FOR TESTING THE LEAK-TIGHTNESS OF A FUEL TANK

(75) Inventors: Thomas Herm, Hohenstein (DE); Frank Kutzner, Altenstadt (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/990,167

(22) Filed: Nov. 21, 2001

(65) Prior Publication Data

US 2002/0062820 A1 May 30, 2002

(30) Foreign Application Priority Data

Nov. 28, 2000 (DE) .......................... 100 58 963

(51) Int. Cl.⁷ .............................. F02M 37/04
(52) U.S. Cl. ...................... 123/520; 123/516
(58) Field of Search .................. 123/516, 518, 123/519, 520; 73/118.1, 119 A

(56) References Cited

U.S. PATENT DOCUMENTS

| | | | | |
|---|---|---|---|---|
| 5,297,527 A | * | 3/1994 | Suzuki et al. | 123/520 |
| 5,419,299 A | * | 5/1995 | Fukasawa et al. | 123/520 |
| 6,044,314 A | | 3/2000 | Cook et al. | |
| RE37,895 E | * | 10/2002 | Kuroda et al. | 123/520 |
| 6,467,463 B2 | * | 10/2002 | Kitamura et al. | 123/516 |
| 6,487,892 B1 | * | 12/2002 | Ito et al. | 123/520 |

FOREIGN PATENT DOCUMENTS

| | | | |
|---|---|---|---|
| DE | 41 32 055 A1 | 4/1993 | ......... B60K/15/035 |
| DE | 42 03 099 A1 | 8/1993 | ............ G01F/23/14 |
| DE | 198 36 102 A1 | 2/2000 | ......... B06K/15/035 |
| JP | 01082263 A | 3/2001 | ........... F02M/25/08 |

* cited by examiner

Primary Examiner—Thomas N. Moulis
(74) Attorney, Agent, or Firm—Richard A. Speer; Mayer, Brown, Rowe & Maw

(57) ABSTRACT

A method and an apparatus for testing the leak-tightness of a fuel tank in a vehicle, in which the internal pressure inside the fuel tank is detected, the internal pressure detected is evaluated by weighting this with a value obtained for a change in the speed of the vehicle.

13 Claims, 2 Drawing Sheets

METHOD FOR TESTING THE LEAK-TIGHTNESS OF A FUEL TANK

BACKGROUND OF THE INVENTION

The invention relates to a method and an apparatus for testing the leak-tightness of a fuel tank in a vehicle in which the internal pressure inside the fuel tank is detected.

Increasing environmental protection calls for measurements of the tightness of motor vehicle tanks or the leakage therefrom. A method and an apparatus for detecting the tank filling level according to DE 42 03 099 A1 therefore permits both sensing of the tank filling level and testing of the tank leak-tightness. For this purpose a differential pressure gauge is provided in the upper part of the tank. The known apparatus furthermore comprises a tank leak-tightness testing device, a gas emission test device for testing whether the fuel in the tank is gassing, an evacuation/drainage control device in order to subject the tank to a variation, a gradient determining device for determining the value of pressure change gradient from at least one pressure change and a time span associated therewith.

Use is made of sensor signals from a differential pressure sensor, which is already provided for performing a reliability check on the functioning of a tank venting system interacting with the tank in the motor vehicle. In this case, however, the filling level is determined only indirectly from the pressure above the liquid level. The known method and the known device are therefore rather expensive and inaccurate. Furthermore, it is only possible to measure a filling level if the tank is leak-tight.

BRIEF SUMMARY OF THE INVENTION

The object of the present invention is to further improve the testing of the leak-tightness of a fuel tank. According to the invention this object is achieved in that the internal pressure detected is evaluated by weighting this with a value obtained for a change in the speed of the vehicle.

The invention is based on the finding that pressure measurements in the fuel tank vary greatly as a function of whether the vehicle is stationary, moving at a constant speed or accelerating/decelerating.

An advantageous development of the method according to the invention consists of forming differential pressure values from minimum and maximum values for the internal pressure detected, and generating a fault message if the differential pressure does not reach a predetermined threshold value within a set time once the change in speed exceeds a predetermined value. This provides a reliable check in the event of a correspondingly large change in the speed of the vehicle.

In order to avoid unnecessary, frequently recurrent testing, the method according to the invention may provide for the inference of a test termination signal (Readyflag), if the pressure differential exceeds the threshold value within the set time.

In order also to permit testing of the pressure sensor when at constant speed or stationary, another development of the method according to the invention provides for the inference of a test termination signal also if the change in speed is below the predetermined value and the pressure differential exceeds a predetermined threshold value.

The method according to the invention preferably provides for running of the test each time the vehicle is started.

After inversion, the fault message obtained by means of the method according to the invention can also display the leak-tightness. Provision can be made for display of the fault message and/or its storage for further evaluation.

An apparatus according to the invention, in which a pressure sensor is provided in fuel tanks for detecting the internal pressure, it being possible to feed the output signal from the pressure sensor to a control device, is characterized in that a sensor is designed with the control device for detecting the change in the speed of the vehicle, and the control device is designed to weight the output signal from the pressure sensor with the change in speed.

At the same time, the control device is preferably designed to generate a fault message, in such a way that differential pressure values are formed from minimum and maximum values for the internal pressure detected, and a fault message is generated if the differential pressure does not reach a predetermined threshold value within a set time once the change in speed exceeds a predetermined value.

The change in speed can be detected by means of a tachometer and corresponding differentiation of the output signal in the control device or by means of an acceleration sensor.

In addition, the apparatus according to the invention may be designed in such a way that a test termination signal (Readyflag) is inferred, if the pressure differential exceeds the threshold value within the set time.

In order also to permit checking of the pressure sensor in the absence of any change in the speed of the vehicle, the apparatus according to the invention may include provision for the control device to be designed in such a way that a test termination signal is also inferred if the change in speed is below the predetermined value and the pressure differential exceeds a predetermined threshold value.

Means may be provided both for displaying the fault message and for storing the fault message for subsequent diagnosis.

BRIEF DESCRIPTION OF THE DRAWINGS

The invention permits numerous embodiments. One such embodiment is represented diagrammatically in the drawing comprising more than one figure and is described below. In the drawing.

DETAILED DESCRIPTION OF THE INVENTION

Figure 1:
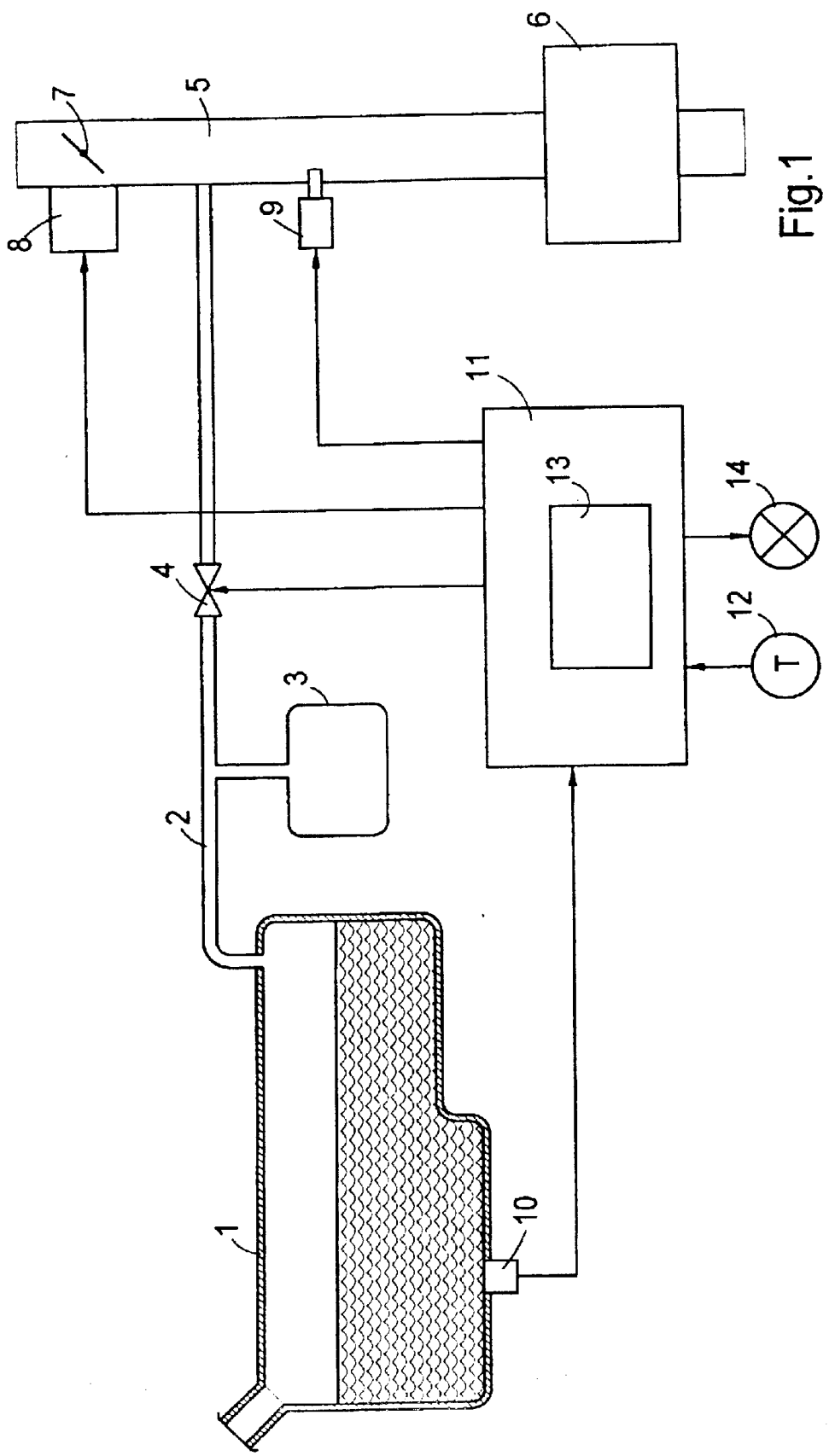
FIG. 1 shows an apparatus according to the invention in diagrammatic form.

The fuel tank 1 is connected to the inlet manifold 5 of an internal combustion engine 6 by way of a vent line 2 with an activated charcoal canister 3 and also by way of a vent valve 4. In the inlet manifold 5 is a throttle valve 7, with or without drive device 8. The nozzle of an injection valve 9 also protrudes into the inlet manifold 5. A pressure sensor 10 measuring the internal pressure of the fuel tank is connected to an input of a control device 11, which furthermore controls other functions of the internal combustion engine 6 and for this purpose is connected to the drive 8 of the throttle valve 7, to the injection valve 9 and to the vent valve 4. The details of these functions are known and need not be explained further in connection with the invention.

The control device 11 receives a speed signal from a speed sensor 12. The actual control device constitutes a computer having the necessary components, which are not shown in detail. Only a memory 13 is indicated, which stores the programs and data needed for performing the method according to the invention. The memory 13 may also be used to store data for a subsequent diagnosis, in which it can be determined, for example, whether the fuel tank was leak-tight throughout the preceding period. A display device 14 for displaying a fault message is also connected to the control device 11.

Figure 2:
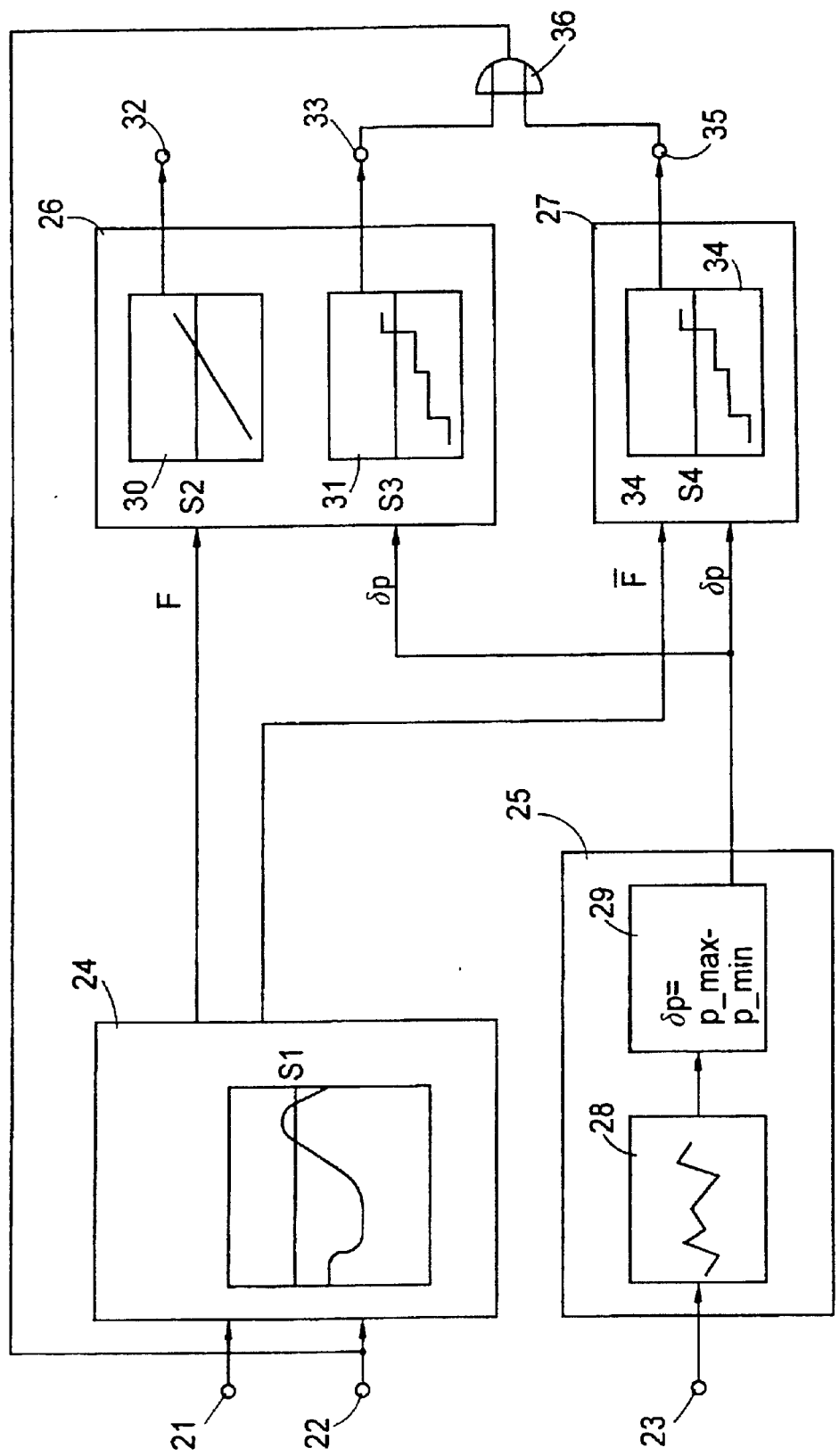
FIG. 2 shows a flow chart for the method according to the invention.

FIG. 2 shows the data processing in the control device 11 (FIG. 1) in so far as this relates to the method according to the invention. At 21 the speed change dv/dt is fed in, at 22 the information that there is no Readyflag present, and at 23 the tank internal pressure p. The further processing stages are divided up into determination of the enabling conditions for the negative acknowledgement test at 24, the processing of the measured pressure values at 25, a negative acknowledgement test at 26 and a positive acknowledgment test at 27.

The negative acknowledgement test 26 is enabled at 24 by comparing dv/dt with a threshold value S1. If this is exceeded, an enablement F for the negative acknowledgement test 26 is given, whilst no enablement $\bar{F}$ is given for the positive acknowledgement test 27.

At 28, as part of the processing of the pressure values 25, extreme values for the tank internal pressure p_max and p_min are collected, from which a maximum pressure differential δp is formed at 29. This is fed both to the negative acknowledgement test and to the positive acknowledgement test 27.

In the negative acknowledgement test 26 a time window is formed at 30 through incrementing of a counter up to a threshold value S2. At 31 the pressure differential δp is compared with a threshold value S3. If this threshold value is exceeded inside the time window, a Readyflag is emitted at 33.

In the positive acknowledgement test the pressure differential δp is likewise compared with the threshold value S4 and if exceeded a Readyflag is emitted at 35. The positive acknowledgement test serves to check not only the leak-tightness of the fuel tank when the vehicle is stationary, but also the functioning of the sensor 10 (FIG. 1).

The two Readyflags at the outputs 33 and 35 are linked by an OR operation at 36 and are fed to the input 22, so that the test is terminated if one of the Readyflags appears.

What is claimed is:

1. A method for testing the leak-tightness of a fuel tank in a vehicle in which the internal pressure inside the fuel tank is detected, wherein the internal pressure detected is evaluated by weighting this with a value obtained for a change in the speed of the vehicle.

2. The method as claimed in claim 1, wherein differential pressure values are formed from minimum and maximum values for the internal pressure detected, and a fault message is generated if the differential pressure does not reach a predetermined threshold value within a set time once the change in speed exceeds a predetermined value.

3. The method as claimed in claim 2, wherein a test termination signal (Readyflag) is inferred, if the pressure differential exceeds the threshold value within the set time.

4. The method as claimed in claim 3, wherein a test termination signal is also inferred if the change in speed is below the predetermined value and the pressure differential exceeds a predetermined threshold value.

5. The method as claimed in one of the preceding claims, wherein the test is run each time the vehicle is started.

6. The method as set forth in claim 4 wherein a fault message is displayed.

7. The method as set forth in claim 6 wherein the fault message is stored for subsequent evaluation.

8. An apparatus for testing the leak-tightness of a fuel tank comprising, a pressure sensor in the fuel tank for detecting the internal pressure, it being possible to feed an output signal from the pressure sensor to a control device, wherein a sensor is designed with the control device for detecting change in the speed of the vehicle, and the control device is designed to weight the output signal from the pressure sensor with the change in speed.

9. An apparatus as claimed in claim 8, wherein the control device is designed in such a way that differential pressure values are formed from minimum and maximum values for the internal pressure detected, and a fault message is generated if the differential pressure does not reach a predetermined threshold value within a set time once the change in speed exceeds a predetermined value.

10. The apparatus as claimed in claim 9, wherein the control device is further designed in such a way that a test termination signal (Readyflag) is inferred, if the pressure differential exceeds the threshold value within the set time.

11. The apparatus as claimed in claim 10, wherein the control device is further designed in such a way that a test termination signal is inferred if the change in speed is below the predetermined value and the pressure differential exceeds a predetermined threshold value.

12. The apparatus as claimed in one of claims 8 to 11, characterized by means for displaying the fault message.

13. The apparatus as set forth in claim 12 characterized by means (13) for storing the fault message.

* * * * *